United States Patent [19]

Svab

[11] Patent Number: 4,649,773

[45] Date of Patent: Mar. 17, 1987

[54] CONTINUOUSLY VARIABLE TRANSMISSION

[75] Inventor: Eugen Svab, Cologne, Fed. Rep. of Germany

[73] Assignee: Ford Motor Company, Dearborn, Mich.

[21] Appl. No.: 748,873

[22] Filed: Jun. 26, 1985

[30] Foreign Application Priority Data

Jul. 6, 1984 [DE] Fed. Rep. of Germany ..... 34248560

[51] Int. Cl.⁴ ........................ F16H 37/00; F16H 57/10
[52] U.S. Cl. ........................................ 74/730; 74/732; 74/740; 74/785
[58] Field of Search ................. 74/688, 689, 732, 740, 74/785, 764, 730

[56] References Cited

U.S. PATENT DOCUMENTS

| | | | |
|---|---|---|---|
| 3,044,316 | 7/1962 | Forster | 74/862 |
| 3,375,733 | 4/1968 | Browning | 74/689 |
| 4,467,669 | 8/1984 | Kawamoto | 74/688 |
| 4,530,256 | 7/1985 | Hattori | 74/689 |
| 4,549,447 | 10/1985 | Sakakibara | 74/689 |
| 4,553,450 | 11/1985 | Gizard | 74/764 |

FOREIGN PATENT DOCUMENTS

| | | | |
|---|---|---|---|
| 0004412 | 10/1979 | European Pat. Off. | 74/689 |
| 0081260 | 6/1983 | European Pat. Off. | 74/688 |
| 0105515 | 4/1984 | European Pat. Off. | 74/689 |
| 3326770 | 6/1984 | Fed. Rep. of Germany | 74/689 |
| 0039346 | 4/1981 | Japan | 74/740 |
| 0049458 | 5/1981 | Japan | 74/689 |

Primary Examiner—Leslie Braun
Assistant Examiner—David Novais
Attorney, Agent, or Firm—Donald J. Harrington; Keith L. Zerschling

[57] ABSTRACT

In a transmission unit for motor vehicles with a continuously variable traction member transmission and forward-reverse planetary gearing associated therewith, the engine crankshaft being disposed approximately in the longitudinal median plane of the vehicle and directly connected or is connected by way of a hydrokinetic torque converter (3) to the input member (8) of the forward-reverse planetary gearing (7) and the output member thereof being disposed at the driving end and connected by first fixed gearing 15 and 16 to a primary shaft (18) which is connected by way of the traction member (21) to a secondary shaft (24) disposed laterally at approximately the same level as the primary shaft, the secondary shaft (24) being connected by way of second fixed gearing 26 and 27 to the driven shaft (28) which is disposed approximately in the longitudinal median plane of the vehicle.

4 Claims, 4 Drawing Figures

CONTINUOUSLY VARIABLE TRANSMISSION

GENERAL DESCRIPTION OF THE INVENTION

My invention relates to a transmission unit for motor vehicles with a continuously variable sheave and belt or chain assembly.

A transmission unit for rear wheel drive motor vehicles with a continuously variable ratio belt or chain and a forward-reverse planetary gear associated therewith is disclosed in U.S. Pat. No. 3,044,316. The driving engine in that disclosure is disposed approximately in the longitudinal median plane of the vehicle. The engine crankshaft axis and the transmission primary shaft lie on the same axis. The primary shaft drives, by way of the belt or chain, either a secondary shaft disposed laterally from and directly connected to the driven shaft (see FIG. 22) or an auxiliary shaft disposed laterally from and parallel to the primary shaft. In the latter case a secondary sheave and belt or chain assembly drive the secondary shaft which is likewise disposed in the longitudinal median plane of the vehicle and connected to the driven shaft which drives the rear wheels (see FIG. 23).

In both of these known designs either the auxiliary shaft or the secondary shaft is disposed laterally at a substantial distance from the central axis. This results in a pronounced bulging in the region of the cardan tunnel of the motor vehicle body. In the mass production of motor vehicles, during which motor vehicles of the same model must be manufactured to accommodate a manually controlled change-speed transmission as well as an automatic transmission, a suitably modified bodywork floor group must be provided, and this results in correspondingly high costs. The necessary modification is particularly substantial in designs that include a single belt of chain connection between the primary and driven shafts.

In the case of designs that include two belts or chains and a secondary shaft between the primary and driven shafts, the manufacturing cost of the transmission is substantially increased although the housing is somewhat lighter. Such double traction member designs, furthermore, are less efficient since the losses are multiplied.

The object of this invention is to provide an improved transmission for motor vehicles with a continuously variable traction member transmission wherein the manufacturing cost is reduced and wherein the structural size is so compact it can be accommodated in the forward area of a cardan tunnel of a motor vehicle which is normally designed to receive a neutral clutch arrangement and a manually shiftable change-speed transmission.

The driving shaft of the driving engine is disposed approximately in the longitudinal median plane of the vehicle and is directly connected or is connected by way of an hydraulic clutch or by way of a hydrokinetic torque converter to the input member of a forward and reverse planetary gear. That planetary gear is disposed in the longitudinal median plane of the vehicle and its output member disposed at the driving end is connected by first fixed gearing to a primary countershaft that is arranged laterally.

The primary countershaft is connected by way of the traction member to a secondary countershaft disposed laterally at approximately the same level, and the secondary shaft is connected by way of second fixed gearing to the driven shaft, which is disposed approximately in the longitudinal median plane of the vehicle and which drives the rear wheels. This arrangement makes it possible to locate the forward bearing of the lateral primary and secondary shafts far forward so that the space remaining in the center above the bearings can be used to accommodate the forward-reverse planetary gear and a fluid pressure pump for developing a working pressure for the transmission clutches and brakes.

It is essential to position the traction member transmission as far forward as possible in the lower region of the cardan tunnel because for a desired gearing ratio and a specific torque to be developed, the axial distance between the primary and secondary shafts and the diameter of the cone pulleys are substantially predetermined. The transmission unit, according to the invention, can be positioned far forward in the lower region of the cardan tunnel of a normal floor group for a motor vehicle, and the driving motor and the driven shaft thus can be disposed preferably approximately in the longitudinal median plane of the motor vehicle.

By virtue of the fact that the input member of the forward-reverse planetary gear is a hollow shaft extending axially through the planetary gear and is connected at the take-off end to the planet carrier formimg the input member, and because the sun gear thereof forming the output member is a hollow shaft extending axially backward through the planetary gear and is connected at the driving end to the first fixed gearing, the forward bearings for the primary and secondary shaft and the corresponding servo and cone-pulley arrangements can be moved forward. The first fixed gearing disposed on ahead of the traction members and the second fixed gearing disposed after the traction members can be formed as meshing, helical tooth gears or as corresponding chain drives.

The cone-pulley arrangement is preferably arranged on the primary shaft with its adjusting servo in the take-off condition. On the secondary shaft the cone-pulley arrangement is preferably arranged with its adjusting servo in the driving condition.

In their arrangement with the primary and secondary shafts, the input and the driven shaft axes form a triangle, thus permitting an advantageous low position of the cardan shaft.

PARTICULAR DESCRIPTION OF THE INVENTION

Figure 1:
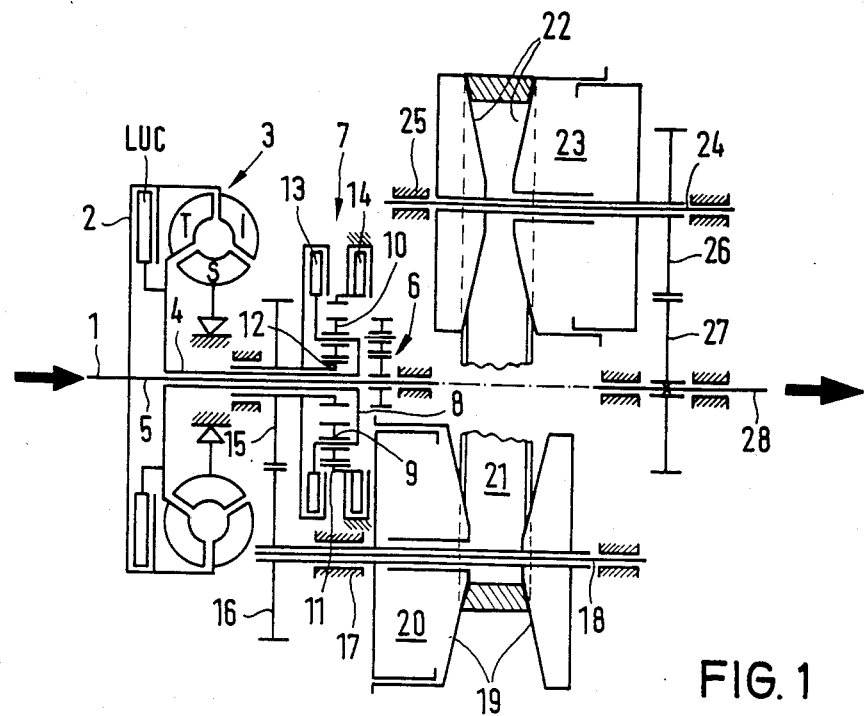
FIG. 1 is a schematic diagram of a first embodiment of the invention.
Figure 2:
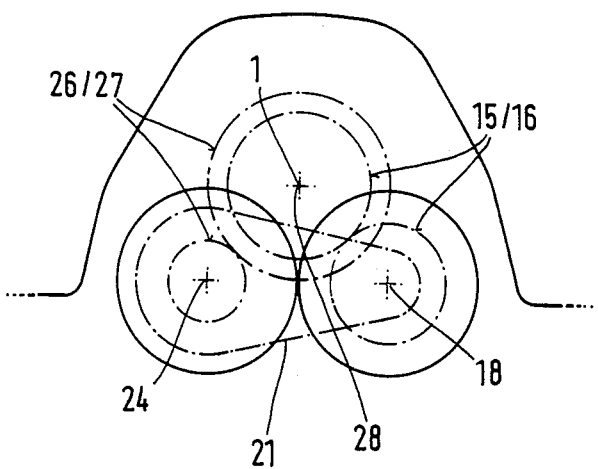
FIG. 2 is a schematic view of the shaft arrangement in the cardan tunnel of the motor vehicle with fixed gearing in the form of pairs of helical tooth gear elements.

In FIGS. 1 and 2 the crankshaft of an internal combustion engine forms the driving shaft 1, which is connected in a known manner to the driving shell 2 of a hydrokinetic torque converter 3. The converter comprises a pump part I, a stator part S and a turbine part T and has a converter lockup clutch LUC. The turbine shaft of the torque converter 3 forming the input shaft 4 of the transmission unit can be connected directly to the driving shell 2 by way of the converter lockup clutch LUC for avoiding slippage losses.

The driving shaft 1 is connected drivably to a pump drive shaft 5, which extends through the turbine or input sleeve shaft 4 to a fluid pressure pump 6 represented as a positive displacement gear pump. The converter lockup clutch LUC is connected to the sleeve shaft.

The turbine or input shaft 4 extends axially through a forward and reverse planetary gear unit 7 and is connected at the take-off end to the planet carrier 8 forming the input member of the planetary gear unit 7. The planet carrier 8 carries two sets of planet gears 9 and 10, which are in mutual engagement. One set 9 engages ring gear 11 of the planetary gear unit 7 and set 10 engages sun gear 12 of the planetary gear unit 7.

In addition, in the forward-and-reverse planetary gear unit 7 there is provided a forward drive clutch 13 by way of which the planet carrier 8 is connected to the sun wheel 12, and a reverse drive clutch 14 by way of which the ring gear 11 is fixed to the transmission housing.

The sun gear 12 forms the output member of the planetary gear 7. It is connected to a hollow shaft which extends axially back relative to the driving direction. The hollow shaft is connected to part 15 of a first fixed gear unit 15 and 16. The second part 16 of the gearing 15 and 16 is disposed in the torque flow path in front of the forward bearing 17 of the primary shaft 18, whose cone pulley assembly 19 is arranged in such a way that the corresponding adjusting servo 20 is disposed on the driving side.

The primary shaft 18 together with its cone-pulley assembly 19 is connected in a driving manner by way of the traction member 21 to the cone-pulley assembly 22 and the adjusting servo 23 of the secondary shaft 24, whose forward bearing 25 is disposed axially at the level of the fluid pressure pump 6.

The secondary shaft 24 is connected by way of second fixed gearing 26 and 27 to the driven shaft 28, which drives the rear wheels of the motor vehicle.

FIG. 2 illustrates the arrangement of the axes of the various shafts, the two fixed units and the variable ratio cone-pulleys.

Figure 3:
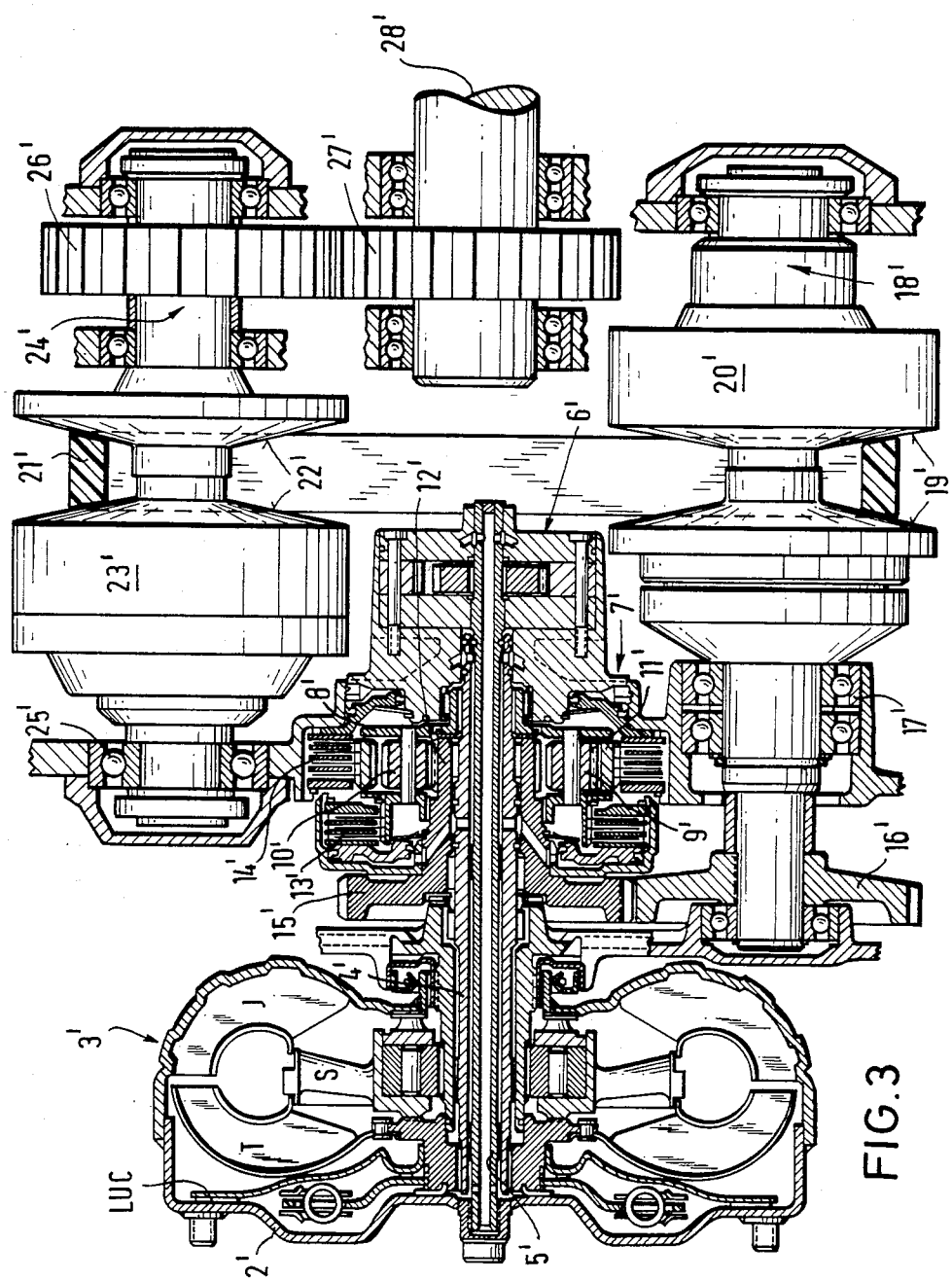
FIG. 3 shows a transmission cross-sectional layout view of the embodiment of the invention illustrated in FIG. 1.
Figure 4:
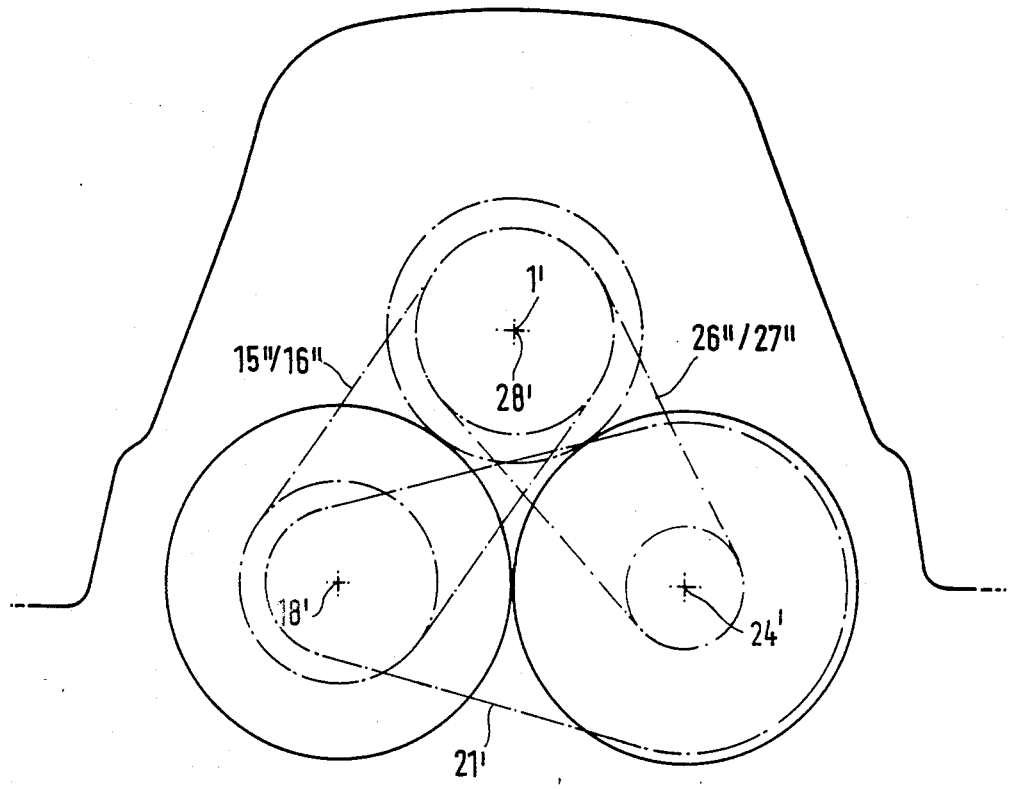
FIG. 4 is a schematic view of a shaft arrangement in the cardan tunnel of a motor vehicle with fixed torque transfer means in the form of drive chains.

A structural embodiment of the invention is shown in FIGS. 3 and 4. The essential components of the embodiment are identified with the same reference numerals used in FIG. 1, but prime notations are added. In FIG. 3 a hydrokinetic torque converter 3' is connected drivably to an internal combustion engine (not shown) by way of its drive shell 2'. It includes a converter lockup clutch LUC, a pump part I, a stator part S and a turbine part T.

The turbine part T is connected by splines to a turbine or input sleeve shaft 4' which extends towards the take-off side. A pump drive shaft 5' is connected to the drive shell 2' in a driving manner and extends through the turbine or input shaft 4' to a fluid pressure pump 6' disposed on the take-off side of a forward-and-reverse planetary gear unit 7'.

The turbine or input shaft 4' extends through the planetary gear unit 7' towards the take-off side and is connected there by a spline to the planet carrier 8' forming the input member of the planetary gear unit 7'. The planet carrier 8' is provided with two sets of planet pinions 9' and 10', which engage with one another. The planet pinions 9' engage ring gear 11' of the planetary gear unit 7' while the planet pinions 10' engage sun gear 12' of the planetary gear unit 7'.

The planet carrier 8' can be connected by way of a forward drive clutch 13' to the sun gear 12' in order to effect the forward drive range of the transmission. The annulus 11' can be fixed to the transmission housing by way of reverse drive clutch 14' in order to effect the reverse drive range of the transmission.

The sun gear 12' forming the output member of the planetary gear 7' is integral with a first part 15' of first fixed gear unit 14 and 16. The second part 16' of the first fixed gear unit 15 and 16 is mounted on the primary shaft 18' in front of the forward bearing 17' of the latter.

The forward bearing 17' of the primary shaft 18' can be disposed in the same radial plane as the planetary gear 7', so that the cone-pulley assembly 19' mounted on the primary shaft 18' can be moved axially towards the driving end. The adjusting servo 20' of the primary shaft is preferably arranged towards the take-off end.

The primary shaft 18' drives the cone-pulley assembly 22' and the adjusting servo 23' thereof on the secondary shaft 24' by way of the traction member 21'. The forward bearing 25' of the secondary shaft 24' can likewise be disposed in the radial plane of the planetary gear 7'.

The secondary shaft 24' is connected drivably by way of second fixed gear unit 26 and 27 to the driven shaft 28', which is connected in conventional manner to the driven rear wheels of the motor vehicle by way of a cardan shaft.

FIG. 3 shows the first fixed gear unit 15 and 16 and the second fixed gear unit 26 and 27 as sets of helical tooth gears, and the corresponding bearings of the primary and secondary shafts 18' and 24'. The gears are indicated only diagrammatically since their design lies within the discretion of a person skilled in the art.

FIG. 4 shows the axial arrangement of the different shafts of the transmission unit in combination with two fixed chain drives which are indicated in dash-dot lines with the reference numerals 15' and 16' and 26" and 27".

By virtue of the fact that the transmission unit according to the invention has its forward-reverse planetary gear positioned in front of the traction members, the input member of the planetary gear is toward the forward torque take-off end and the output member of the planetary gear is toward the rearward driving end. The forward, first fixed gearing can be moved far enough forward toward the torque converter that the forward bearing of the primary shaft and of the secondary shaft can be situated in substantially the same radial plane as the planetary gear.

The traction members and the cone-pulley assemblies can be moved both axially forward and downward, so that they can be disposed in the lower region of a normal cardan tunnel of a motor vehicle. The axial width and the effective diameters of the traction members and the cone-pulley assemblies are reduced enough to allow this disposition. An important requirement for the use of a transmission of this type in mass production is thus met since the great majority of mass produced models must include a manual clutch and transmission arrangement and a body floor construction adapted to this arrangement.

In the embodiment of the transmission unit according to the invention as shown in the figures, the input and output shafts are shown in a coaxial arrangement, so that the primary and secondary shafts form a triangle of axes.

The input shaft can be arranged axially parallel to but vertically offset with respect to the driven shaft. As a result they form, with the primary and secondary shafts, a rhombus of axes, in which the driven shaft and therefore the cardan shaft can extend in a desired manner at an even lower level.

Where necessary (e.g., cross-country vehicles and light commercial vehicles) it is possible to extend the already wide transmission range of the continuous transmission with a flange-mounted, geared reduction unit, not shown.

Having described preferred embodiments of my invention, what I claim and desire to secure by U.S. Letters Patent is:

1. In an infinitely variable power transmission for a wheeled vehicle having an internal combustion engine disposed longitudinally with respect to the vehicle median plane and a driven shaft;
   - a hydrokinetic torque converter on the axis of said engine including an impeller connected to said engine and a turbine;
   - a planetary gear unit comprising a sun gear, a ring gear, a carrier and a planet pinion assembly on said carrier having pinions in meshing engagement with said sun and ring gear;
   - a first cone pulley assembly comprising an axially adjustable cone pulley part mounted on a primary countershaft parallel with the axis of said converter and gear unit;
   - a second cone pulley assembly comprising an axially adjustable cone pulley part mounted on a secondary countershaft parallel with the axis of said converter and gear unit;
   - a traction member drivably connecting the first and second cone pulley assemblies;
   - first fixed gearing located between said planetary gear unit and said torque converter connecting a torque output element of said planetary gear unit to said first cone-pulley assembly, a torque input element of said planetary gear unit connected to said turbine;
   - clutch and brake means for selectively locking together for rotation in unison the elements of said planetary gear unit and for selectively braking a reaction element of said planetary gear unit;
   - a sleeve shaft connected to said sun gear, said clutch means being located between said torque converter and said sun gear and adapted to connect said sun gear to said carrier to effect said locking of said elements of said planetary gear unit;
   - a torque input shaft extending through said sleeve shaft and connecting said turbine with said torque input element of said planetary gear unit; and
   - second fixed gearing connecting drivably said second cone-pulley assembly to said driven shaft.

2. The combination as set forth in claim 1 wherein said planetary gear unit is located between said cone-pulley assemblies and said first fixed gearing, the latter being located between said torque converter and said planetary gear unit.

3. The combination as set forth in claim 1 wherein said planetary gear unit comprises a ring gear, a sun gear, a carrier, a first set of planet pinions on said carrier meshing with said sun gear, a second set of planet pinions on said carrier meshing with said ring gear and with said first set of planet pinions.

4. The combination as set forth in claim 2 wherein said planetary gear unit comprises a ring gear, a sun gear, a carrier, a first set of planet pinions on said carrier meshing with said sun gear, a second set of planet pinions on said carrier meshing with said ring gear and with said first set of planet pinions.

* * * * *